(12) United States Patent
Jang et al.

(10) Patent No.: US 8,788,485 B2
(45) Date of Patent: Jul. 22, 2014

(54) METHOD AND SYSTEM FOR REMOTE BINDING OF META-CONTENT TO A UNIFORM RESOURCE IDENTIFIER

(75) Inventors: Soobaek Jang, Hamden, CT (US); Dimitri Kanevsky, Ossining, NY (US); Michael W. Lipton, Stamford, CT (US); Joshua M. Woods, Beacon Falls, CT (US); Alexander Zlatsin, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 1875 days.

(21) Appl. No.: 11/747,535

(22) Filed: May 11, 2007

(65) Prior Publication Data

US 2008/0281785 A1    Nov. 13, 2008

(51) Int. Cl.
*G06F 7/00* (2006.01)
*G06F 17/30* (2006.01)

(52) U.S. Cl.
USPC .......................................... 707/719; 707/769

(58) Field of Classification Search
None
See application file for complete search history.

(56) References Cited

U.S. PATENT DOCUMENTS

| | | | |
|---|---|---|---|
| 5,917,615 A * | 6/1999 | Reifman et al. | 358/468 |
| 6,295,051 B1 | 9/2001 | Kanevsky et al. | |
| 6,665,659 B1 | 12/2003 | Logan | |
| 6,738,535 B2 | 5/2004 | Kanevsky et al. | |
| 6,847,977 B2 | 1/2005 | Abajian | |
| 7,028,252 B1 | 4/2006 | Baru et al. | |
| 2002/0101537 A1 | 8/2002 | Basson et al. | |
| 2005/0183109 A1 | 8/2005 | Basson et al. | |
| 2006/0217990 A1 | 9/2006 | Theimer et al. | |

FOREIGN PATENT DOCUMENTS

| | | |
|---|---|---|
| EP | 1349164 A1 | 10/2003 |
| GB | 2406399 A | 3/2005 |
| JP | 2002351873 A | 12/2002 |
| JP | 2005085004 A | 3/2005 |

OTHER PUBLICATIONS

Nagao et al., "Semantic Annotation and Transcoding: Making Web Content More Accessible", IEEE MultiMedia 8(2), pp. 69-81, 2001, IEEE.*
Thong et al., "Speechbot: An Experimental speech-based Search Engine for Multimedia Content in the Web", CRL Jun. 2001, Cambridge Research Laboratory Technical Reports Series, Jul. 2001.*

* cited by examiner

*Primary Examiner* — Michael Hicks
(74) *Attorney, Agent, or Firm* — Cantor Colburn LLP

(57) ABSTRACT

A method and system for remote binding of meta-content to a uniform resource indicator are provided. The method includes providing a script to a web browser application in response to the web browser, application accessing the uniform resource identifier of a content provider system and requesting an asset therefrom. The script is generated by a remote server system and is provided to the web browser application by routing the web browser application from the content provider system to the remote server system. The method also includes receiving a call from the web browser application at the remote server system via the script. The call includes the uniform resource identifier of the content provider system. Using the uniform resource identifier, the remote server system queries a data source to determine whether meta-content for the asset is available. Upon determining the meta-content is available for the asset, the method includes returning the meta-content to the web browser application for interpretation.

13 Claims, 2 Drawing Sheets

METHOD AND SYSTEM FOR REMOTE BINDING OF META-CONTENT TO A UNIFORM RESOURCE IDENTIFIER

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

This invention relates to web services, and particularly to a method and system for remote binding of meta-content to a uniform resource identifier (URI).

2. Description of the Background

Before our invention, there were many challenges in assigning semantics and meta-information to addressable content. Typically, a content owner (e.g., a content provider via the web), is responsible for implementing and managing these tasks. However, many content providers, particularly small businesses, do not have the resources to provide offer these capabilities.

What is needed, therefore, is a way to enable content providers to utilize remote meta-content that is remotely bound to a particular uniform resource indicator (URI) at their web site.

SUMMARY OF THE INVENTION

The shortcomings of the prior art are overcome and additional advantages are provided through the provision of a method for remote binding of meta-content to a uniform resource indicator are provided. The method includes providing a script to a web browser application in response to the web browser application accessing the uniform resource identifier of a content provider system and requesting an asset therefrom. The script is generated by a remote server system and is provided to the web browser application by routing the web browser application from the content provider system to the remote server system. The method also includes receiving a call from the web browser application at the remote server system via the script. The call includes the uniform resource identifier of the content provider system. Using the uniform resource identifier, the remote server system queries a data source to determine whether meta-content for the asset is available. Upon determining the meta-content is available for the asset, the method includes returning the meta-content to the web browser application for interpretation.

A system corresponding to the above-summarized method is also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

Technical Effects

As a result of the summarized invention, technically we have achieved a solution which remotely binds meta-content of a remote service provider system to a uniform resource indicator of a content provider system with little or no interaction of the content provider system. The remote binding is implemented using a script that is downloaded to a web browser application requesting access to content from the content provider system. The script is activated on the web browser application and communicates directly with the remote server provider system to receive a service provided therefrom without further assistance from the content provider system.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

A method and system for remote binding of meta-content to a uniform resource indicator are provided in accordance with exemplary embodiments of the invention. The remote binding of meta-content to a uniform resource identifier enables end-users, who access content (also referred to herein as "assets") from a content provider system, to directly receive services associated with the content, which are not provided by content provider system, but rather are provided by a remote server system. The content may be any organized collection of data.

Figure 1:
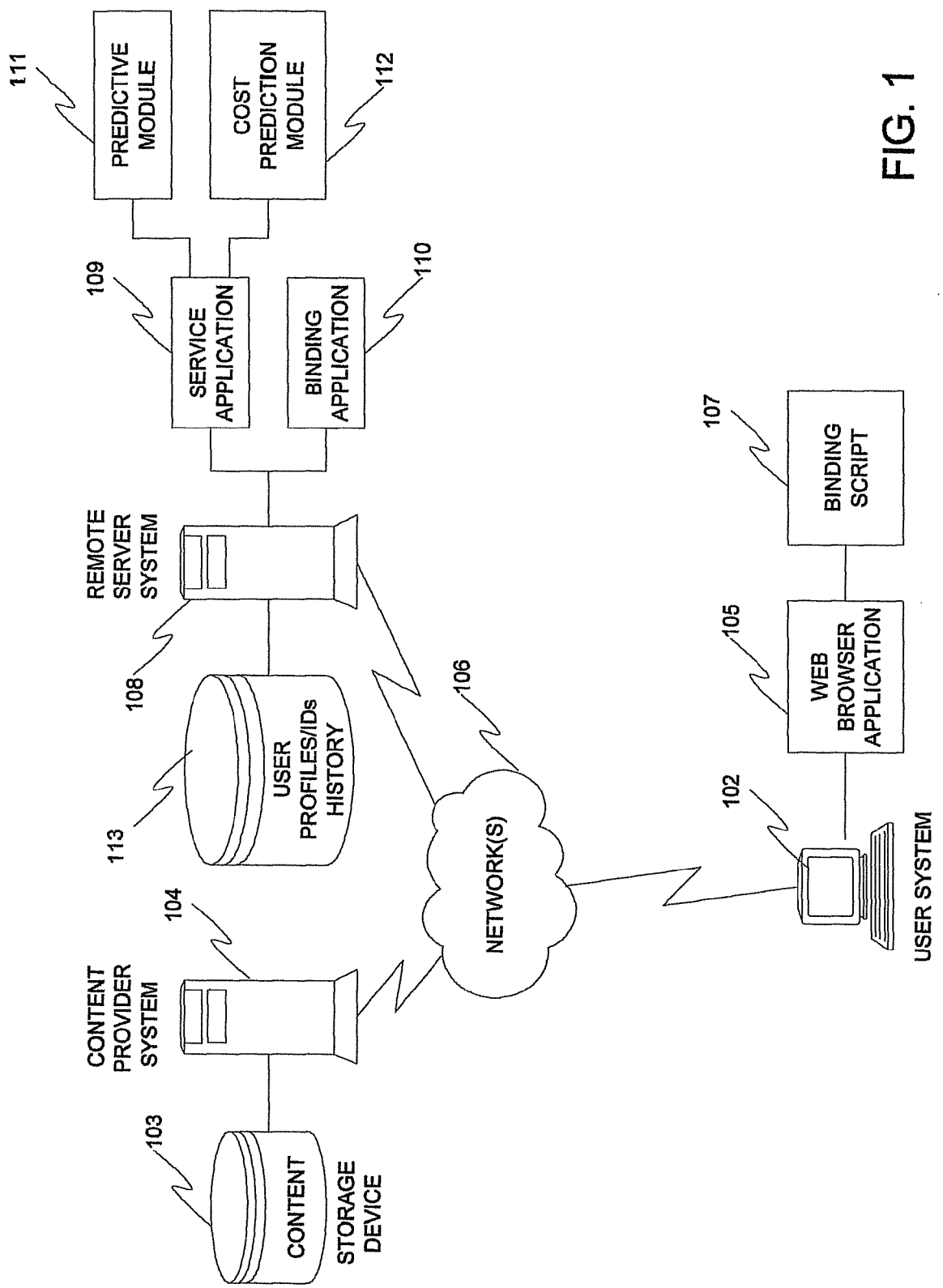
FIG. 1 illustrates one example of a system upon which remote binding of meta-content to a uniform resource identifier may be implemented in an exemplary embodiment.

Turning now to the drawings in greater detail, it will be seen that in FIG. 1 there is a system upon which remote binding of meta-content to a uniform resource identifier may be implemented in accordance with an exemplary embodiment. The system of FIG. 1 includes one or more user systems 102 (one user system 102 shown in FIG. 1 for ease of description) through which users at one or more geographic locations may contact a content provider system 104. The user system 102 may be coupled to the content provider system 104 via one or more networks 106. Each user system 102 may be implemented using a general-purpose computer executing one or more computer programs for carrying out the processes described herein. The user system 102 may be personal computers (e.g., a lap top, a personal digital assistant) or host attached terminals (e.g., via an intranet, extranet, etc.). The user system 102 executes a web browser application 105 for communicating with content provider system 104.

Content provider system 104 may be implemented as a web server that provides content to the user system 102 (e.g., via web browser application 105 executing on the user system 102). The content provider system 104 implements a web site through which communication may be made. The web site may include a plurality of uniform resource identifiers (URIs), each of which identifies a particular web page, or content (i.e., "asset"), offered by the content provider system 104. The user system 102 may access the web site of the content provider system 104 via the web browser application 105 by entering a uniform resource locator (URL) of the content provider system 104, or alternatively, via a web search engine. Content, or assets, accessed by the user system 102 may be stored in a storage device 103 in communication with the content provider system 104. Content may include web pages, text files, audio files, video files, images, and/or multi-media files.

Also shown in FIG. 1 is a remote server system 108 in communication with user system 102 via network(s) 106 as described herein. Remote server system 108 provides one or more services that are not offered by the content provider system 104. The services may be provided via a service application 109 executing on the remote server system 108. For example, the remote server system 108 may provide a transcription service that translates content provided in one media format into another media format. By way of non-limiting example, the transcription service may be IBM's® Caption Me Now™, which provides captioning of audio files (e.g., Webcasts) via, speech recognition tools, in order to make them accessible for the deaf and/or hard of hearing. In the above example, content provider system 104 may provide audio files (e.g., Webcasts, news clips, etc.) and remote service system 108 may provide transcription services (e.g., captioning for the audio files). Remote server system 108 may be implemented as a web, applications, and database management server for providing the various services to end-users, such as user system 102. Remote server system 108 also implements a binding application 110 for providing the remote binding of meta-content to a URI as described further herein.

The service application 109 includes a predictive module 111 and a cost prediction module 112. The predictive module 111 may further include a transcription component, an error estimation component, a topic identifier, a decoder, and statistical estimator, as described herein. The cost prediction module 112 includes a business component that estimates frequency of requests for services by checking user histories and topics as described herein.

Remote server system 108 is in communication with a storage device 113 for storing service-related information. For example, storage device 113 may store user profiles, user identifiers, and user history information.

Network(s) 106 may include any type of known networks including, but not limited to, a wide area network (WAN), a local area network (LAN), a global network (e.g. Internet), a virtual private network (VPN), and an intranet. The networks 106 may be implemented using a wireless network or any kind of physical network implementation known in the art. A user system 102 may be coupled to the content provider system 104 and/or remote server system 108 through multiple networks (e.g., intranet and Internet) so that not all user systems 102 are coupled to the content provider system 104 and/or remote server system 108 through the same network.

Figure 2:
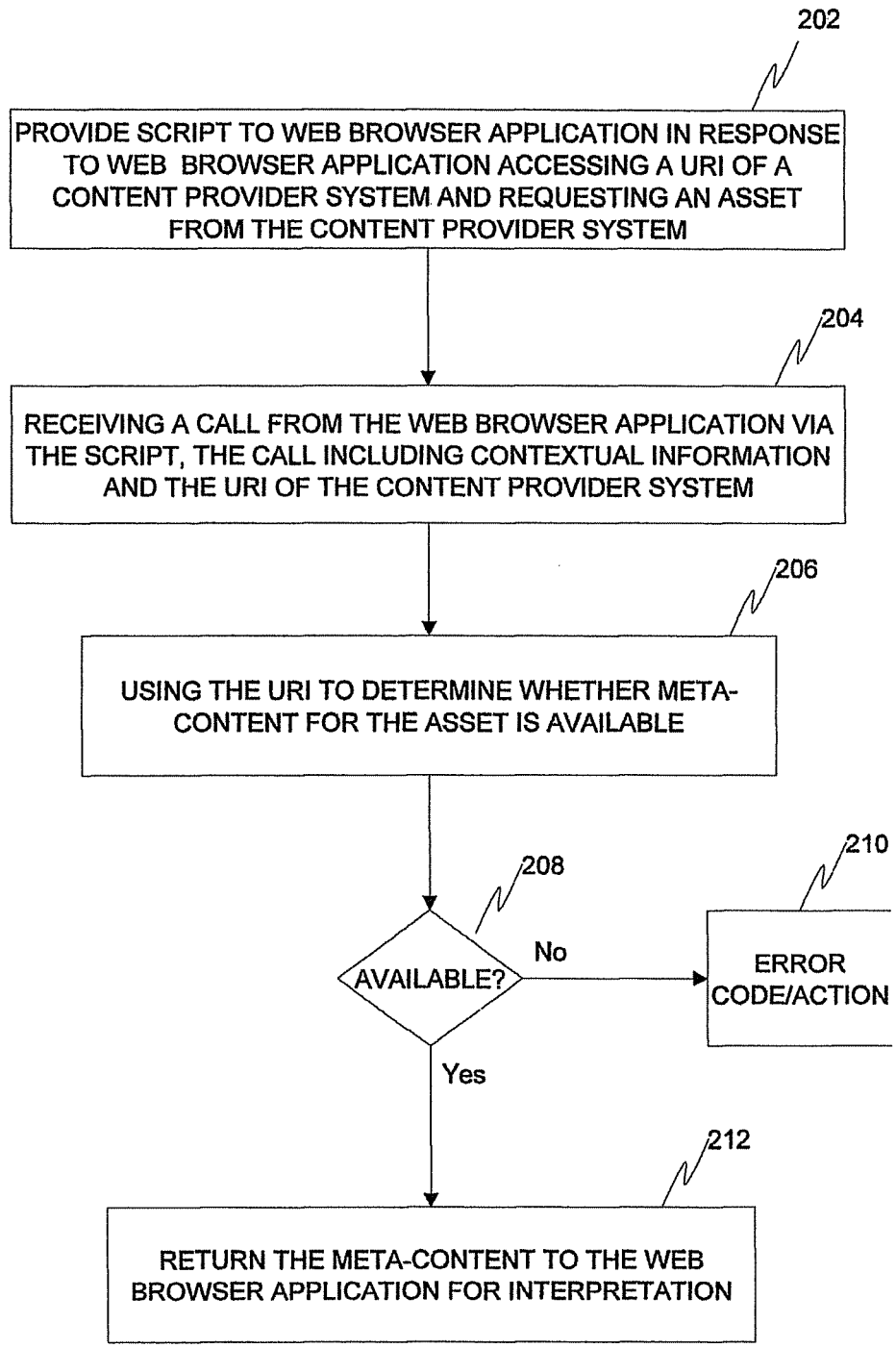
FIG. 2 illustrates one example of a flow diagram describing a process for remote binding of meta-content to a uniform resource identifier in an exemplary embodiment.

Turning now to FIG. 2, a process for remote binding of meta-content to a uniform resource identifier (URI) will now be described in accordance with exemplary embodiments.

At step 202, the remote server system 108 provides a script (via binding application 110) to the web browser application 105 in response to the web browser application 105 accessing the uniform resource identifier of content provider system 104 and requesting an asset (e.g., a media file) from the storage device 103 of content provider system 104. The script is generated by the binding application 110 of remote server system 108 which provides a service (via service application 109) that is not offered by the content provider system 104. The script is provided to the web browser application 105 by routing the web browser application 105 from a web page of the content provider system 104 to the remote server system 108. The script is downloaded by the web browser application 105, as shown in FIG. 1 as binding script 107. The script 107 analyzes current contextual information for the uniform resource identifier, such as web page layout of the URI.

At step 204, the remote server system 108 receives a call (e.g., remote procedure call) from the web browser application 105 via the script 107 and web browser application 105. The call includes the contextual information and the uniform resource identifier of the content provider system 104. At step 206, the binding application 110 uses the uniform resource identifier to query a data source (e.g., internal memory) of the remote server system 108 to determine whether meta-content for the asset is available at the remote server system 108. If the meta-content is not available at the remote server system 108 at step 208, the binding application 110 performs one of several actions depending upon, e.g., the data format between the remote server system 108 and the user system 102 at step 210. For example, an error code may be returned to the user system (e.g., if the meta information related to additional help information in the context of the web page). In another example, the action may be a request to transcribe a media time and return a ticket number indicating when the transcription will be completed. Alternatively, the action may be a request for additional information to see if a transcription can be authorized by this user.

Alternatively, upon determining the meta-content is available for the asset at step 208, the meta-content is returned to the web browser application 105 for interpretation at step 210.

As indicated above, the service application 109 includes various components via the modules 111 and 112 for implementing the binding services described herein. Predictive module 111 receives the audio/video input and forwards the input to the transcription component. The transcription component provides transcription of the audio/video using, e.g., speech recognition, etc. The transcribed information is analyzed by the error estimator module for accuracy using, e.g., confidence scoring. Alternatively, the audio is transcribed and depending on the outcome, the error estimation component estimates the accuracy. The transcribed information is passed to the topic identifier component to identify a topic of the transcribed information and the information is processed through the decoder component for accuracy. The statistical estimator of accuracy component may use biometrics to identify the needs of a user; that is, estimating the probability of accuracy using, e.g., user profile, user identifier, and/or user history information from storage device 113.

The cost prediction module 112 includes a business component assessing and managing payments for users of the services. The business component may estimate accuracy of transcription results as well as frequency of requests by checking the user history and topics. The business module may suggest to users information that comes from the website, where the user requested audio is to be transcribed. Various users may be sharing costs of payments. For example, a first user may be paying full price while other users share the cost and the first user is reimbursed for the part of the initial payment. The business component may estimate user ability to pay from the history of the user. Some users may be able to pay full cost, while others only a fraction of the cost. The system may be able to identify the risk. A cost estimation may depend upon a number of iterations of requests. While some user may accept this level of accuracy, others may ask for more information. There may be an estimated number of iterations needed to satisfy a user. There may be various business schemes applied, based upon how many iterations would be required for decoding. A cost estimate is performed accordingly and a final suggestion is presented to the user of how much the user is expected to pay.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for remote binding of meta-content to a uniform resource indicator, comprising:
    providing a script to a web browser application in response to the web browser application accessing the uniform resource identifier of a content provider system and requesting an asset from the content provider system, the script generated by a remote server system providing a service that is not offered by the content provider system, wherein the script is provided to the web browser application by routing the web browser application from the content provider system to the remote server system, the script analyzing current contextual information for the uniform resource identifier;
    receiving a call from the web browser application at the remote server system via the script, the call including the contextual information and the uniform resource identifier of the content provider system;
    using the uniform resource identifier to query a data source of the remote server system to determine whether meta-content for the asset is available at the remote server system;
    upon determining the meta-content is available for the asset, returning the meta-content to the web browser application for interpretation; and
    predicting required decoding accuracy, and predicting the cost of creation of the meta-content by evaluating user history, topic of meta-content, and potential number of users.

2. The method of claim 1, wherein the asset is an organized set of data.

3. The method of claim 1, wherein the service is a transcription service and the meta-content is a data transcription file of an audio file, the audio file comprising the asset.

4. The method of claim 1, wherein the current contextual information includes a web page layout of the uniform resource locator.

5. The method of claim 1, wherein the asset is a transcription service for audio or video content provided by the content provider system, the method further comprising:
    transcribing the content; and
    evaluating accuracy of transcribed content upon one of a request or suggestion of a user of the web browser application and estimation derived from a user identifier of the user.

6. The method of claim 1, wherein predicting the cost of creation of the meta-content further includes evaluating a number of iterations of requests from a user.

7. A system for remote binding of meta-content to a uniform resource indicator, comprising:
    a remote server system providing a service not offered by a content provider system;
    an application executing on the remote server system, the application performing a method comprising:
    receiving a request from a web browser application that has been redirected from the content provider system to the remote server system in response to the web browser application accessing the uniform resource identifier of the content provider system and requesting an asset from the content provider system;
    providing a script to the web browser application, the script generated by the remote server system, the script analyzing current contextual information for the uniform resource identifier;
    receiving a call from the web browser application at the remote server system via the script, the call including the contextual information and the uniform resource identifier of the content provider system;
    using the uniform resource identifier to query a data source of the remote server system to determine whether meta-content for the asset is available at the remote server system;
    upon determining the meta-content is not available for the asset, submitting a request to transcribe meta-content for the asset;
    determining if the user associated with the request to transcribe meta-content is authorized to submit the request to transcribe meta-content; and
    returning a ticket number indicating when the request to transcribe the meta-content will be fulfilled upon determining the user is authorized to submit the request to transcribe meta-content.

8. The system of claim 7, wherein the service is a transcription service and the meta-content is a data transcription file of an audio file, the audio file comprising the asset.

9. The system of claim 7, wherein the current contextual information includes a web page layout of the uniform resource indicator.

10. The system of claim 7, wherein the asset is and organized set of data.

11. The system of claim 7, wherein the asset is a transcription service for audio or video content provided by the content provider system, and upon determining the meta-data has become available, the method further compromising:
    transcribing the content; and
    evaluating accuracy of transcribed content upon one of a request or suggestion of a user of the web browser application and estimation derived from a user identifier of the user.

12. The system of claim 7, wherein the method further comprises predicting required decoding accuracy, and predicting the cost of creation of the meta-content by evaluating user history, topic of meta-content, and potential number of users.

13. The system of claim 7, wherein predicting the cost of creation of the meta-content further includes evaluating a number of iterations of requests from a user.

\* \* \* \* \*